UNITED STATES PATENT OFFICE.

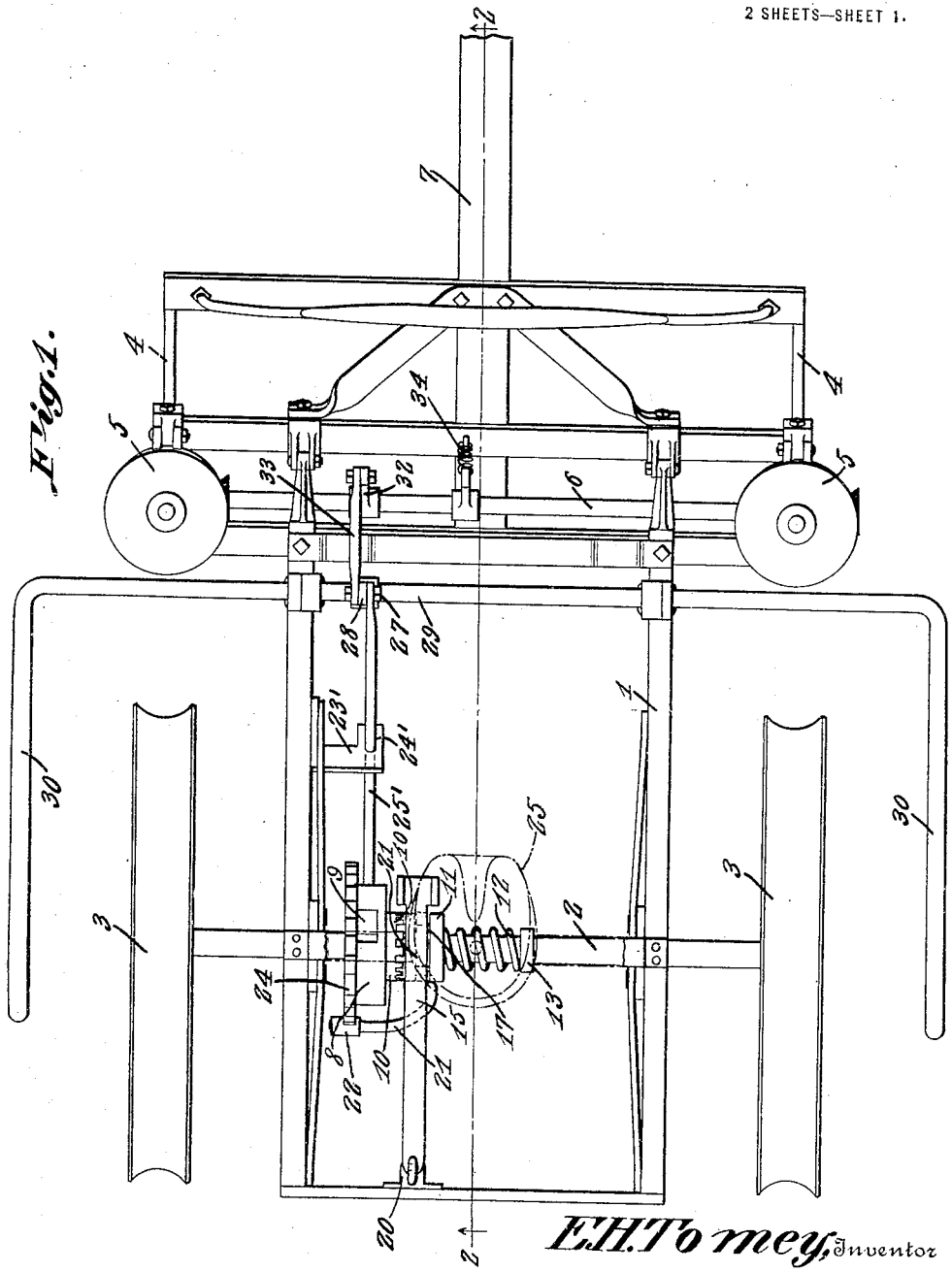

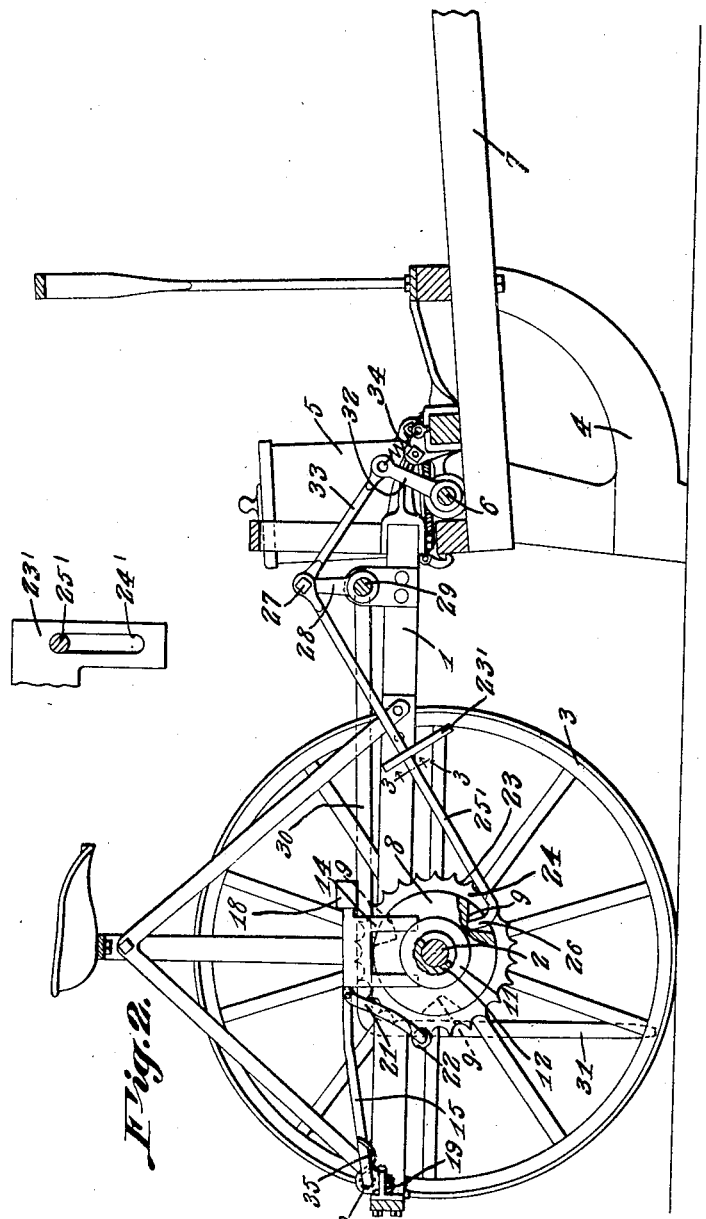

EARL HICKS TOMEY, OF ELNORA, INDIANA.

CORN-PLANTER.

1,331,222.    Specification of Letters Patent.    Patented Feb. 17, 1920.

Application filed October 18, 1919. Serial No. 331,612.

*To all whom it may concern:*

Be it known that I, EARL H. TOMEY, a citizen of the United States, residing at Elnora, in the county of Daviess and State of Indiana, have invented a new and useful Corn-Planter, of which the following is a specification.

This invention relates to corn planters, one of its objects being to provide a planter having a check row attachment whereby the corn can be planted at regular intervals without requiring the use of a check wire.

Another object is to provide a device of this character which is simple and efficient in operation and can be applied readily to a planter already in use.

A further object is to provide mechanism which is constantly under the control of the operator who can throw it out of or into operation as desired and can advance or retard such operation.

With the foregoing and other objects in view which will appear as the description proceeds the invention consists of certain novel details of construction and combinations of parts which will be hereinafter more fully described and pointed out in the claims, it being understood that various changes may be made in the construction and arrangement of parts without departing from the spirit or sacrificing any of the advantages of the invention as set forth in the appended claims.

In the accompanying drawings the preferred form of the invention has been shown.

In said drawings—

Figure 1 is a plan view of a planter having the present improvements combined therewith.

Fig. 2 is a section on line 2—2, Fig. 1.

Fig. 3 is a section on line 3—3, Fig. 2.

Referring to the figures by characters of reference, 1 designates the frame of a planter mounted on a rotatable axle 2 supported by wheels 3. The seed planting mechanism, including the runners 4, seed hoppers 5 and dropper operating shaft 6, is located at the front end of the frame and said frame is provided with the usual draft tongue indicated at 7.

The attachment constituting the present invention includes a wheel 8 loosely mounted on the axle 2 and provided in its periphery with notches 9. Extending from the hub portion of this wheel at the inner side thereof is a clutch member 10 and another clutch member 11 is feathered on the axle 2 and is normally pressed into engagement with the member 10 by a spring 12 mounted on the axle and seated against a collar 13 on the axle. The clutch member 11 has an annular groove into which projects the forked end 14 of a lever 15 fulcrumed upon the rear portion of the frame 1. The groove receiving the forked end 14 is shown at 17. A foot plate 18 is provided at the front end of the lever 15. The fulcrum of the lever includes a stem 19 swiveled in the frame 1 and having an eye 20 engaged by the lever. This foot lever has a pivoted arm 21 carrying a roller 22 adapted to be seated in any one of a series of notches 23 formed in a flange 24 upon the wheel 8. The driver's seat is indicated at 25.

It will be apparent that by pressing downwardly on the foot plate 18 the roller 22 will rotate the engaged notched flange so as to bring the notch 9 to any desired position and by then moving the lever laterally the clutch member 11 can be engaged with the member 10 so as to allow the axle to rotate with the wheel 8.

A bracket 23' is secured to one side of the frame 1 and has an opening 24' therein through which loosely extends a rod 25'. At its rear end this rod is provided with an upturned finger 26 adapted to project into one of the notches 9 in the wheel 8. The front end of the rod is pivotally connected, at 27, to an arm 28 upstanding from a transverse rock shaft 29 journaled on the frame 1. This shaft projects beyond the sides of the frame 1 and is provided at its ends with marker arms 30 the terminals of which are extended downwardly, as shown at 31.

The shaft 6 has an arm 32 extending upwardly therefrom and the two arms 32 and 28 are connected by a rod 33 so as to move simultaneously. A spring 34 connects the arm 32 to the front portion of the frame 1 and serves to hold the two arms 28 and 32 drawn forwardly.

Under normal conditions the wheel 8 rotates with the axle 2 and during such rotation the notches 9 successively receive the finger 26 and pull on the rod 25' so as to simultaneously rock the two shafts 29 and 6. When the shaft 29 is rocked the ends 31 of the arms 30 are moved downwardly to mark the soil and the seed dropping mechanism is operated at the same time by the actuation of the shaft 6. By pressing the foot lever laterally the clutch members can be disengaged and by their pressing the lever downwardly the wheel 8 will be rotated so as to shift the notches 23 and cause the operation of the marking and dropping mechanism at any point desired.

A spring 35 is connected to the pivoted end of the lever 15 and serves to yieldingly support said lever.

What is claimed is:—

1. The combination with a planter, a dropper operating shaft, a marking device and a shaft therefor, of a rotary axle, a notched wheel thereon, a yieldingly pressed clutch member on the axle and normally coupling the wheel to said axle, a lever, means operated by the lever when moved in one direction for disengaging the clutch member, and means operated by the movement of the lever in another direction for rotating the notched wheel to advance or retard the operation of the dropper operating shaft, a member intermittently operated by the wheel when rotated with the axle, and means operated by the member for simultaneously rocking the two shafts.

2. The combination with a planter including a dropper operating shaft, a transverse shaft, and marker arms at the ends of said transverse shaft, of a rotary axle, a notched wheel loosely mounted thereon, a spring pressed clutch member on the axle and normally coupling the wheel to the axle, a forked lever, means operated by lateral movement of the lever and under the control of the operator for disengaging the clutch members, and means operated by the downward movement of the lever for rotating the notched wheel to advance or retard the operation of the dropper operating shaft, a rod intermittently operated by the wheel when rotated with the axle, and means operated by the rod for simultaneously rocking the two shafts.

In testimony that I claim the foregoing as my own, I have hereto affixed my signature in the presence of two witnesses.

EARL HICKS TOMEY.

Witnesses:
  M. E. EINBECK,
  JOHN GUILFORD.